(12) United States Patent
Huang

(10) Patent No.: US 6,499,849 B1
(45) Date of Patent: Dec. 31, 2002

(54) REAR PROJECTOR THAT CAN ADJUST IMAGE SIZE AND OPERATING METHOD

(75) Inventor: Chen-Cheng Huang, Tao-yuan (TW)

(73) Assignee: Benq Corporation, Taoyuan (TW)

( * ) Notice: Subject to any disclaimer, the term of this patent is extended or adjusted under 35 U.S.C. 154(b) by 122 days.

(21) Appl. No.: 09/664,431

(22) Filed: Sep. 18, 2000

(30) Foreign Application Priority Data

Nov. 19, 1999 (TW) ........................................ 88120280 A

(51) Int. Cl.$^7$ ........................ G03B 21/00; G03B 21/20; G03B 3/00; H04N 3/26; H04N 3/227
(52) U.S. Cl. ........................ 353/121; 353/101; 353/102; 353/69; 353/70; 353/122; 348/745; 348/746; 348/747; 348/806
(58) Field of Search ................................ 353/101, 102, 353/69, 70, 121, 122; 348/745, 806, 746, 747, 181, 184; 359/205, 215

(56) References Cited

U.S. PATENT DOCUMENTS

| 5,521,658 | A | * | 5/1996 | Donohoe ...................... 353/98 |
| 5,883,476 | A | * | 3/1999 | Noguchi et al. ........ 315/368.12 |
| 5,898,465 | A | * | 4/1999 | Kawashimi et al. ......... 348/745 |
| 6,246,446 | B1 | * | 6/2001 | Heimbuch et al. ........... 348/750 |
| 6,310,662 | B1 | * | 10/2001 | Sunakwa et al. ............ 348/747 |
| 6,323,915 | B1 | * | 11/2001 | Marflak et al. .............. 348/704 |
| 6,330,040 | B1 | * | 12/2001 | Kawashima ................. 348/744 |
| 6,333,768 | B1 | * | 12/2001 | Kawashima et al. ......... 348/806 |
| 6,392,612 | B1 | * | 5/2002 | George ......................... 345/20 |
| 2001/0055060 | A1 | * | 12/2001 | Kitazawa ...................... 348/61 |
| 2002/0001044 | A1 | * | 1/2002 | Villamide .................... 348/745 |

\* cited by examiner

*Primary Examiner*—Russell Adams
*Assistant Examiner*—Melissa J Koval
(74) *Attorney, Agent, or Firm*—Winston Hsu

(57) ABSTRACT

A projector has a housing, a screen installed in the front of the housing for displaying an image, a projecting modole installed in the housing, a control module, and at least One detector. The projecting module includes an image generator that converts image signals into an image with a corresponding resolution, and a projecting lens set used for projecting the image onto the back of the screen. When the control module receives a focus-changing signal, the control module will change the focus of the projecting lens set to adjust the size of the image. The detector is installed on the screen for sensing the image on the screen. When the control module receives the focus-changing signal, the control module will continuously change the focus of the projecting lens set to adjust the size of the image until the detector senses the edge of the image.

4 Claims, 5 Drawing Sheets

REAR PROJECTOR THAT CAN ADJUST IMAGE SIZE AND OPERATING METHOD

BACKGROUND OF THE INVENTION

1. Field of the Invention

The present invention relates to a rear projector, and more particularly, to a rear projector that can adjust both the size of the image that it displays, as well as its mode of operation.

2. Description of the Prior Art

When displaying images from different digital sources, the size of the image displayed on a prior art rear projector will change based upon the resolution of the image. Please refer to FIG. 1. FIG. 1 is a diagram of the different sizes of an image displayed at various resolutions. The most common resolutions in use are SVGA (800×600), XGA (1024× 768) and SXGA (1280×1024). As SVGA has the lowest resolution, it appears on the prior art rear projector with the smallest image size. In order to fill the entire display area, the SVGA image must be enlarged. This is usually done digitally by interpolating extra pixels to simulate the higher resolution image. This method, however, can easily lead to distorted images.

SUMMARY OF THE INVENTION

It is therefore a primary objective of the present invention to provide a rear projector that adjusts image size and its operating method to solve the above mentioned problem.

In a preferred embodiment, the present invention provides a rear projector having a housing, a screen installed in the front of the housing for displaying an image, a projecting module installed in the housing, a control module, and at least one detector. The projecting module includes an image generator that converts image signals into an image with a corresponding resolution, and a projecting lens set used for projecting the image onto the back of the screen. The control module is used for controlling the projecting module, and when the control module receives a focus-changing signal, the control module will change the focus of the projecting lens set to adjust the size of the image. The detector is installed at a predetermined position on the screen for sensing the image on the screen, and the detector is electrically connected to the control module. When the control module receives the focus-changing signal, the control module will continuously change the focus of the projecting lens set to adjust the size of the image until the detector senses the edge of the image.

It is an advantage of the present invention that, by adjusting the focus of the projecting lens set, images at various resolutions can be optically adjusted to fit to the screen. This avoids the prior art problem of image deviation caused by digital interpolation.

This and other objectives of the present invention will no doubt become obvious to those of ordinary skill in the art after having read the following detailed description of the preferred embodiment, which is illustrated in the various figures and drawings.

DETAILED DESCRIPTION OF THE PREFERRED EMBODIMENT

Figure 1:
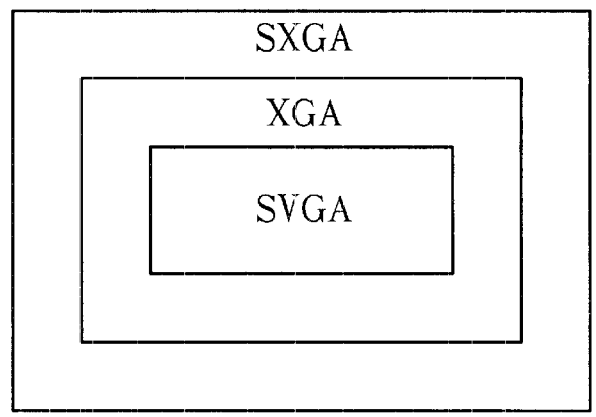
FIG. 1 is a diagram of the different sizes of an image displayed at various resolutions according to the prior art.
Figure 2:
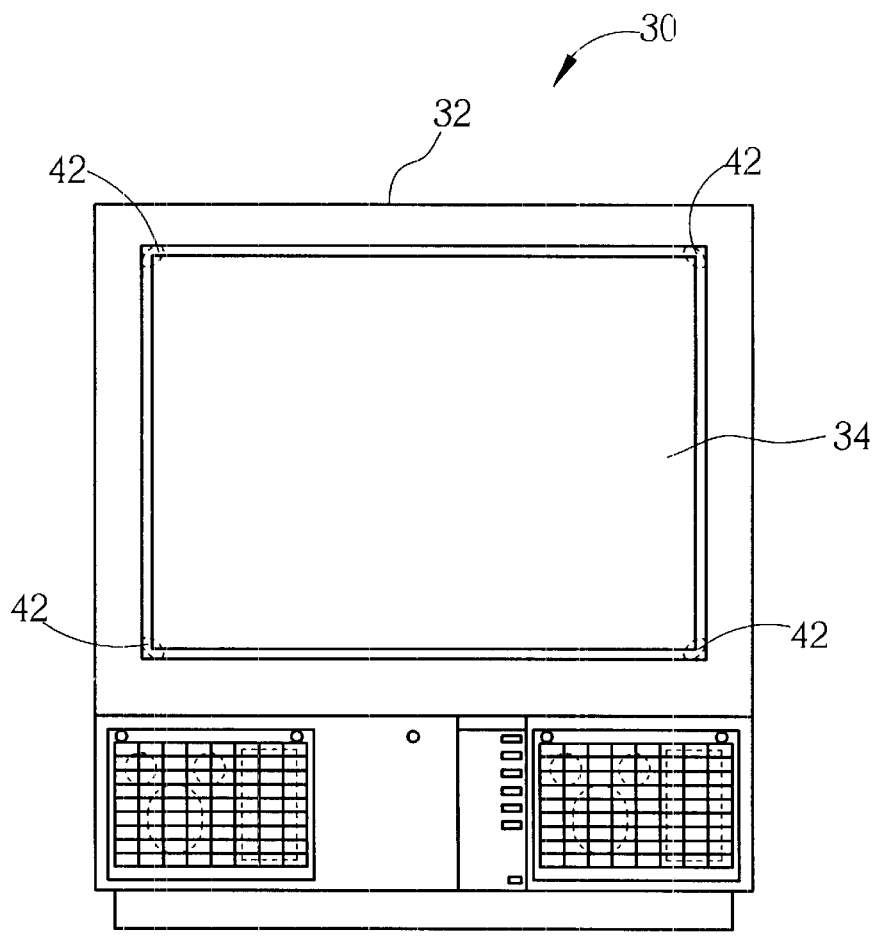
FIG. 2 is a perspective view of a rear projector according to the present invention.
Figure 3:
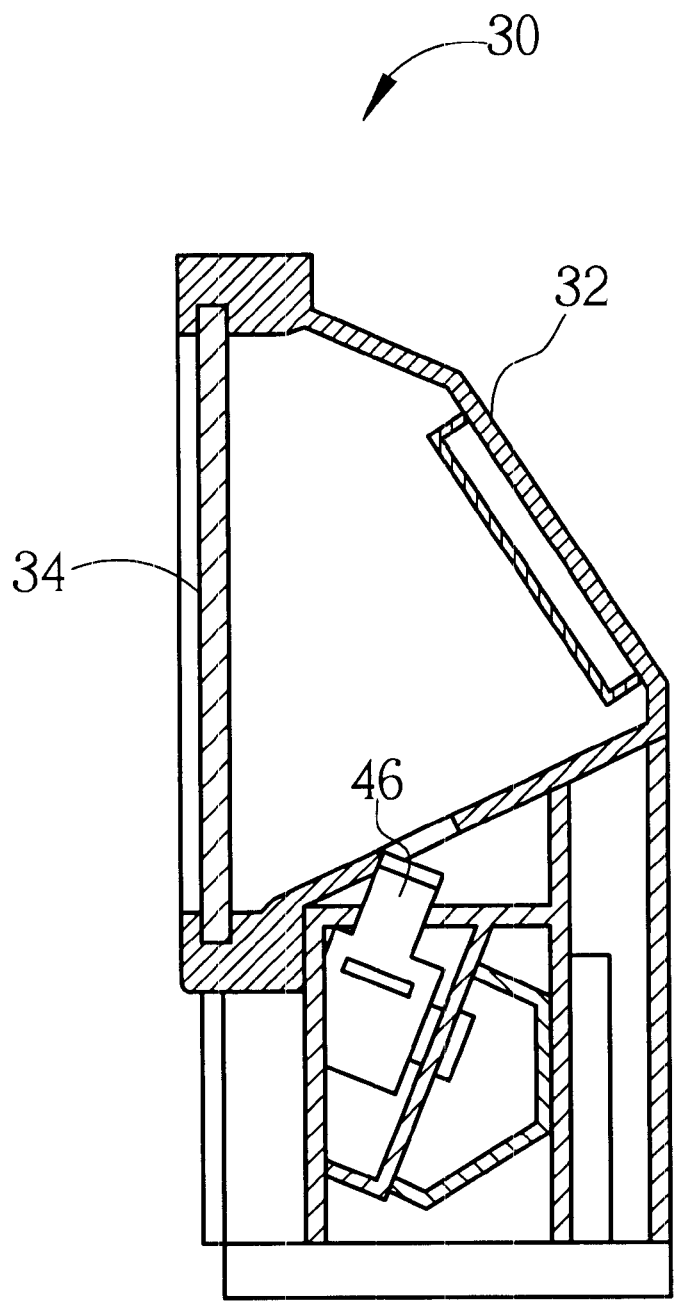
FIG. 3 is a sectional diagram of the rear projector shown in FIG. 2.
Figure 4:
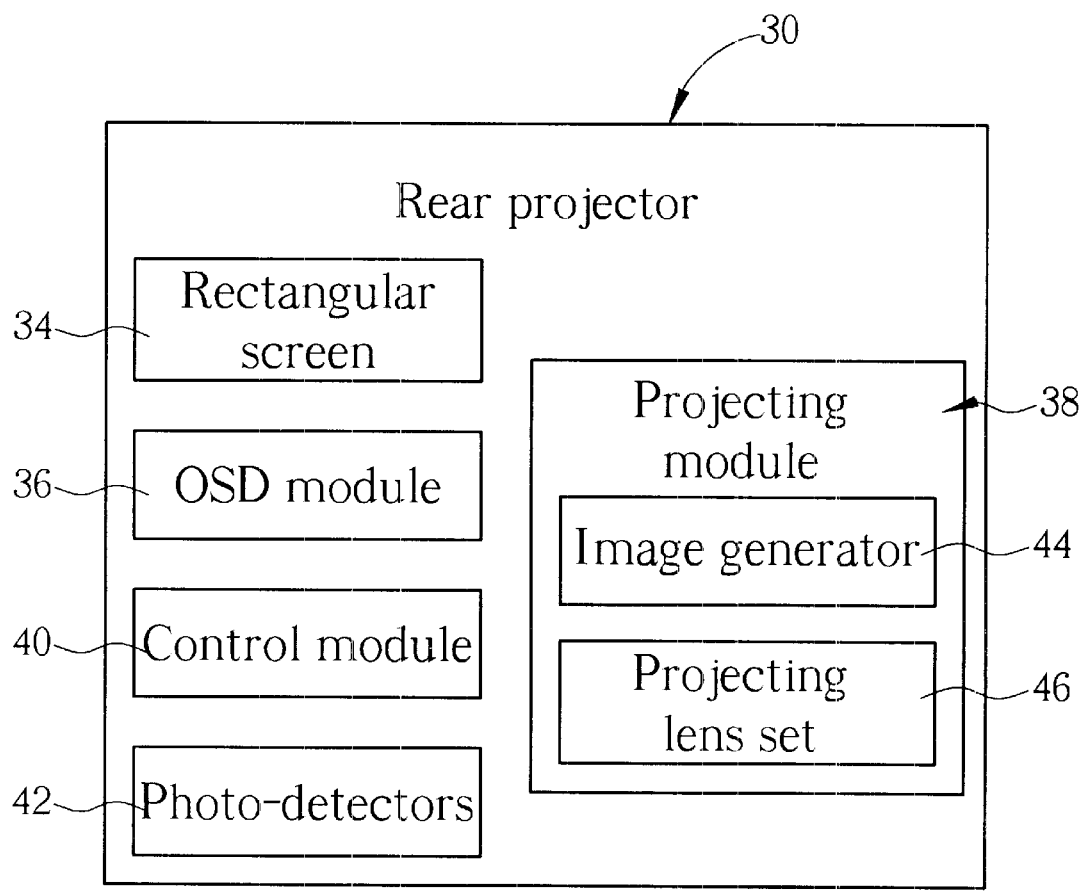
FIG. 4 is a functional block diagram of the rear projector-shown in FIG. 2.

Please refer to FIG. 2 to FIG. 4. FIG. 2 is a perspective view of a rear projector 30 according to the present invention. FIG. 3 is a sectional diagram of the rear projector 30 shown in FIG. 2. FIG. 4 is a functional block diagram of the rear projector 30 shown in FIG. 2. The rear projector 30 comprises a housing 32, a rectangular screen 34 in the front of the housing 32 for displaying images, an OSD (On Screen Display) module 36, a projecting module 38 installed in the housing 32, a control module 40 used for controlling the projecting module 38, and four photo-detectors 42 installed at the four corners of the screen 34 that are electrically connected to the control module 40. The photo-detectors 42 sense the image. The projecting module 38 comprises an image generator 44, which converts received image signals into an image with a corresponding resolution, and a projecting lens set 46 used for projecting the image onto the back of the screen 34. A user can use an interface screen generated by the OSD module (an OSD screen) to change the resolution of the image.

When the resolution of the image from the image generator 44 changes, a focus-changing signal will be sent to the control module 40. When the control module 40 receives the focus-changing signal, the control module 40 will first direct the image generator 44 to convert the received image signals into an image with luminosity-enhanced edges. The control module 40 will then adjust the focus of the projecting lens set 46 so that the image fits the screen 34. This is done by first setting the focus so that the size of the image is decreased to a smallest possible size, The focus of the projecting lens set 46 is then gradually adjusted to increase the image size until the photo-detectors 42 sense the luminosity-enhanced edges of the image.

Figure 5:
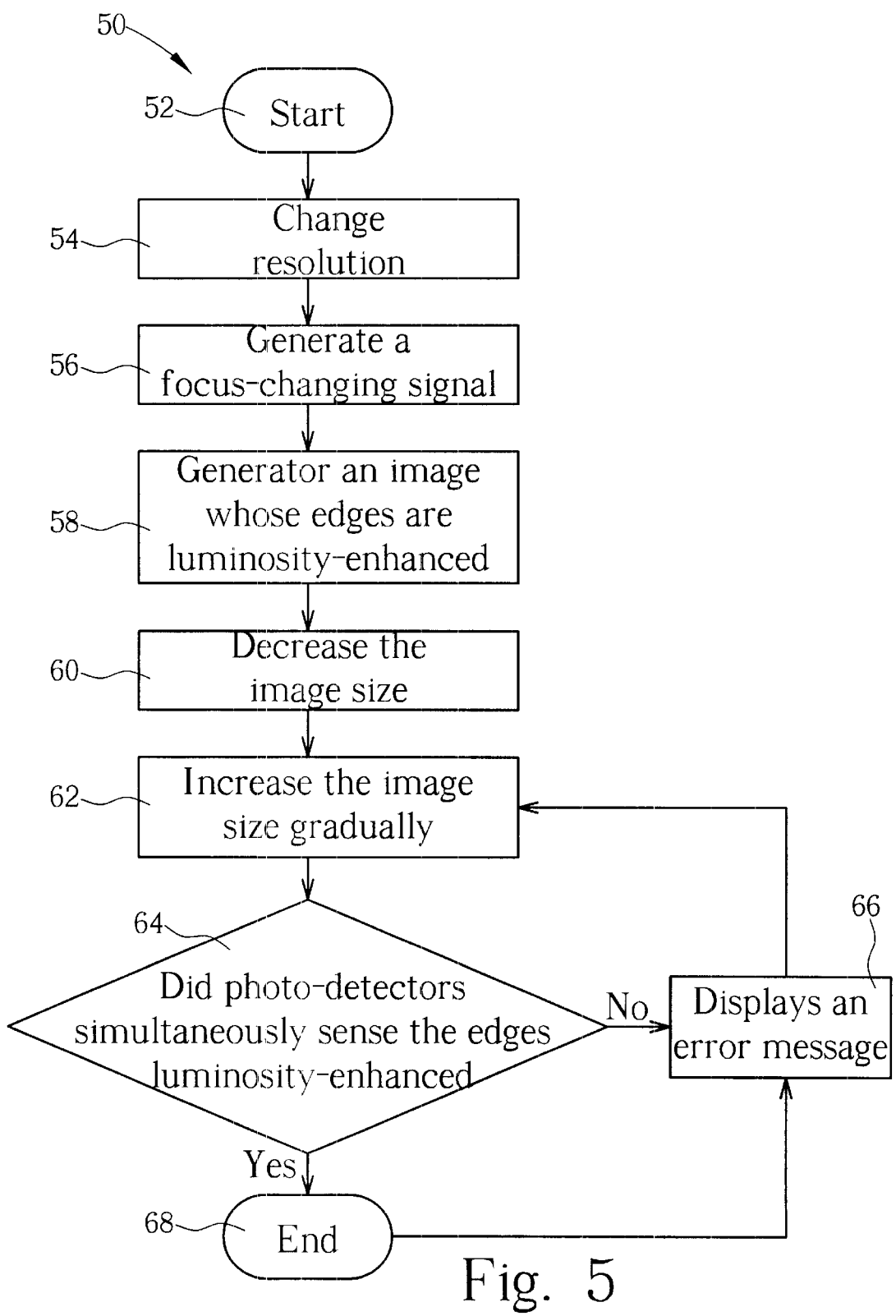
FIG. 5 is a flow chart of the operation of the rear projector shown in FIG. 2.

Please refer to FIG. 5. FIG. 5 is a flow chart 50 of the operation of the rear projector 30 shown in FIG. 2. The operation involves:

Step 52: Start.

Step 54: Change resolution.

Step 56: When the resolution of the image from the image generator 44 changes, send a focus-changing signal to the control module 40.

Step 58: The control module 40 directs the image generator 44 to convert the received image signals into an image whose edges are luminosity-enhanced.

Step 60: The focus of the projecting lens set 46 is adjusted so as to make the size of the image decrease to its smallest size.

Step 62: The focus of the projecting lens set 46 is gradually adjusted to gradually increase the size of the image.

Step 64: Did the four photo-detectors 42 simultaneously sense the luminosity-enhanced edges of the image? If yes, then go to step 68.

Step 66: The screen displays an error message telling the user that the image is tilted.

Step 68: End.

The method is to first decrease the image size and then to gradually increase it. In this way, regardless of the resolution, the image size will always be properly adjusted to fit to the rectangular dimensions of the screen 34. Normally, when the image is gradually enlarged, the four photo-detectors 42 will simultaneously sense the luminosity-enhanced edges of the image. However, when the image is tilted, or is not centered, the four photo-detectors 42 will not simultaneously sense the luminosity-enhanced edges of the image. In this case, the adjustment of the image size will stop when one of the photo-detectors senses the luminosity-enhanced edges of the image.

Figure 6:
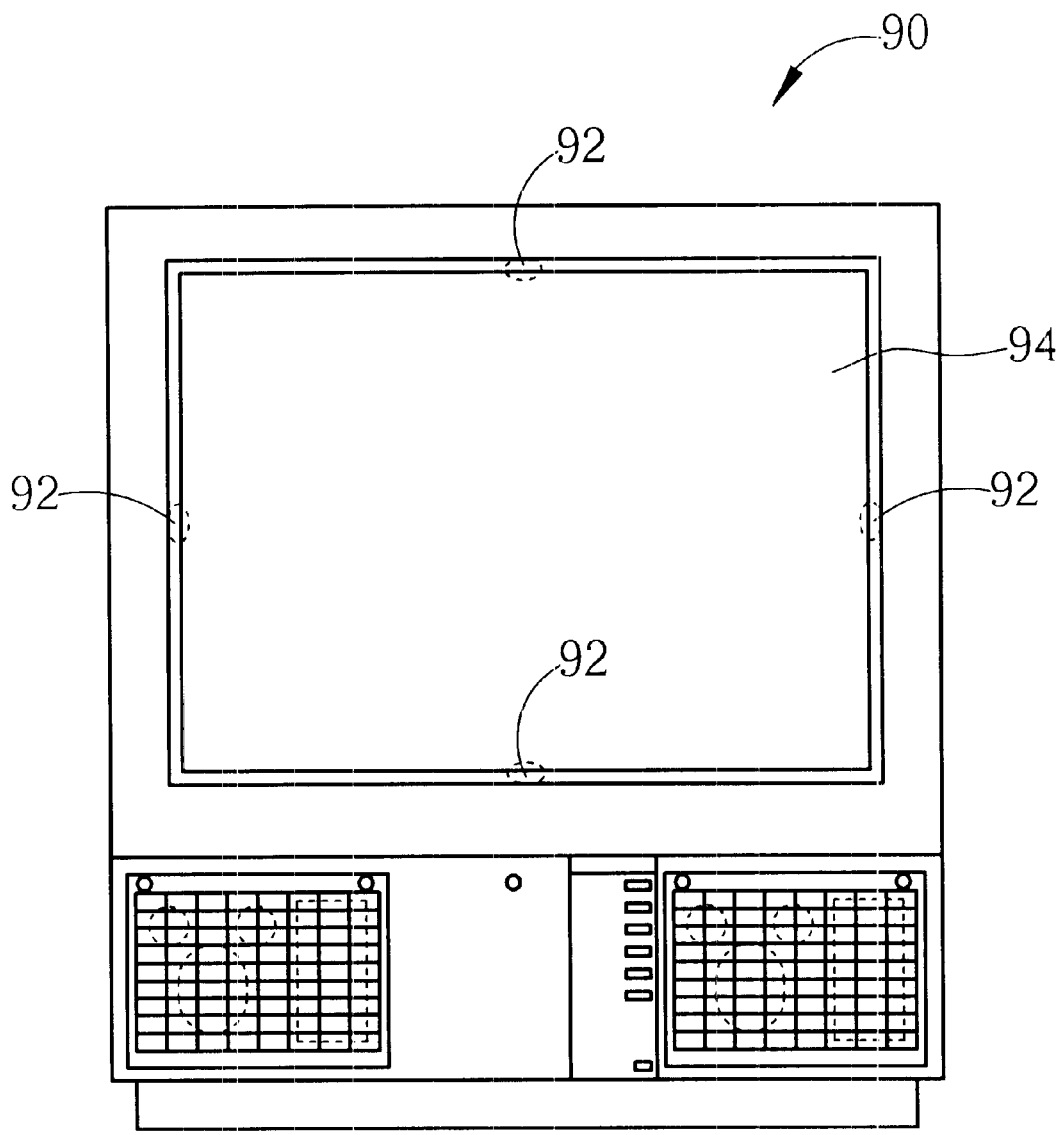
FIG. 6 is a perspective view of an alternative rear projector according to the present invention.

Please refer to FIG. 6. FIG. 6 is a perspective view of an alternative rear projector 90 according to the present invention. The only difference of the rear projector 90 from the above embodiment is that the four detectors 92 of the rear projector 90 are installed in the middle portions of the four edges of the rectangular screen 94. In all other respects, the rear projector 90 is like the above embodiment.

Compared to the prior art rear projector, the present invention rear projectors 30, 90 optically adjust the image size displayed on the screen This is done by adjusting the focus of the projecting lens set 46, scaling images of differing resolutions to fit the rectangular dimensions of the screens 34, 94. By optically scaling the images, the present invention avoids the problem of digital distortion of the prior art.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for adjusting the size of an image of a projector, the projector comprising a screen for displaying the image, an image generator for converting received image signals into the image with a first or second image resolution, a projecting lens set for projecting the image onto the screen, and at least one detector installed at a predetermined position on the screen for sensing the image on the screen; wherein the method comprises:

projecting an image with the first image resolution on the screen;

generating a resolution-changing signal to change the resolution of the image from the first image resolution to the second image resolution;

generating a focus-changing signal to change the focus of the projecting lens set so as to decrease the size of the image with the second image resolution;

changing the focus of the projecting lens set according to the focus-changing signal so as to continuously increase the size of the image with the second resolution; and stopping changing the focus of the projecting lens set when the detector senses the edge of the image.

2. The method of claim 1 wherein when the image generator generates the focus-changing signal, it will convert the received image signals into a picture image whose edges are luminosity-enhanced, and the focus of the projecting lens set will be changed continuously to adjust the size of the image until the detector senses the luminosity-enhanced edges of the image.

3. The method of claim 2 wherein the focus of the projecting lens set is first adjusted so as to make the size of the image decrease and then the focus of the projecting lens set is gradually adjusted so as to make the size of the image increase until the detector senses the luminosity-enhanced edges of the image.

4. The method of claim 2 wherein the rear projector comprises a plurality of detectors and the plurality of detectors are positioned at the edges of the displaying screen; wherein when the plurality of detectors simultaneously sense the edges of the image then adjusting of the size of the image will stop, however, if the plurality of detectors do not simultaneously sense the edges of the image then the projector will display an error message indicating that the image is tilted.

* * * * *